Dec. 7, 1971  S. J. HOFF  3,625,079
VARIABLE RATIO MINI BIKE DRIVE
Filed Sept. 21, 1970  2 Sheets-Sheet 1

INVENTOR
STEPHEN J. HOFF
BY
Trask, Jenkins & Hanley
ATTORNEYS

Dec. 7, 1971 S. J. HOFF 3,625,079
VARIABLE RATIO MINI BIKE DRIVE
Filed Sept. 21, 1970 2 Sheets-Sheet 2
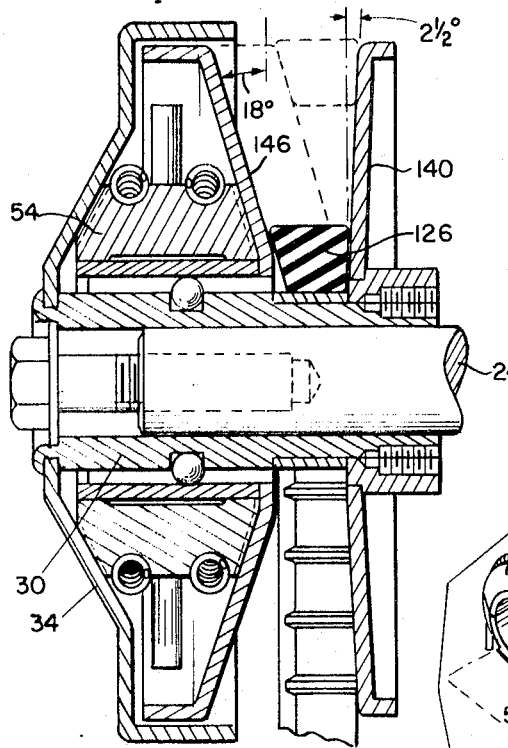
Fig.6
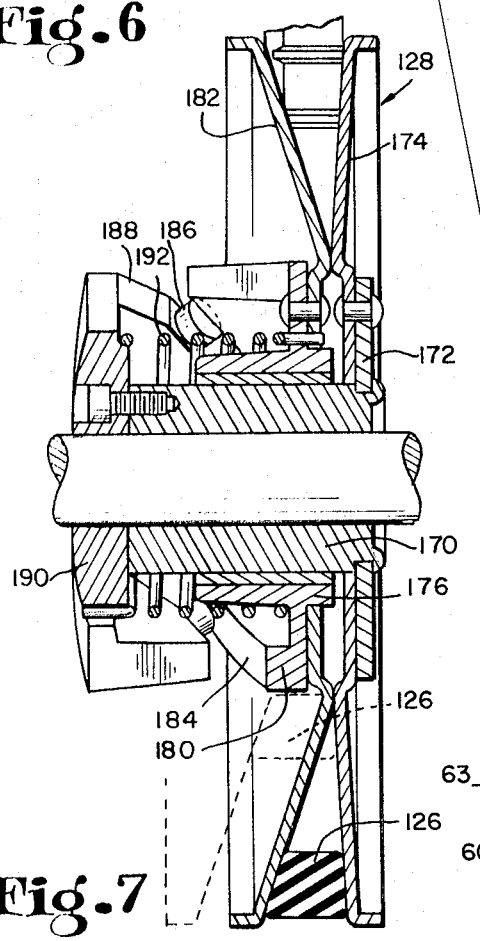
Fig.7
Fig.5
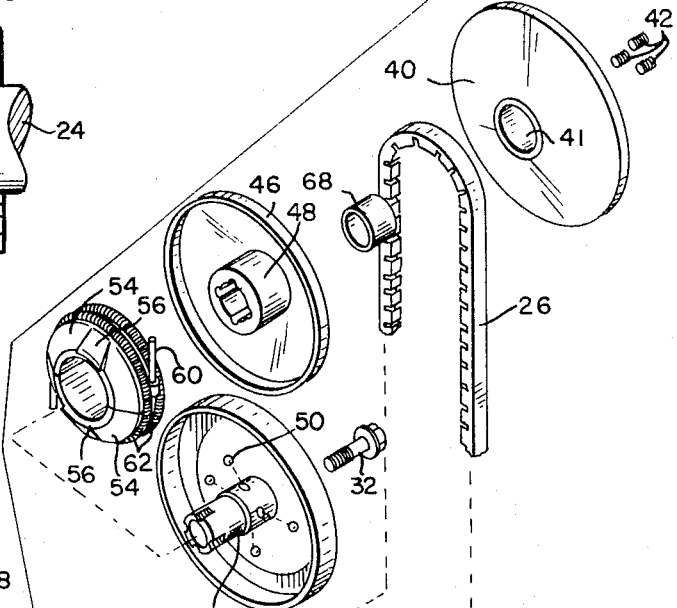
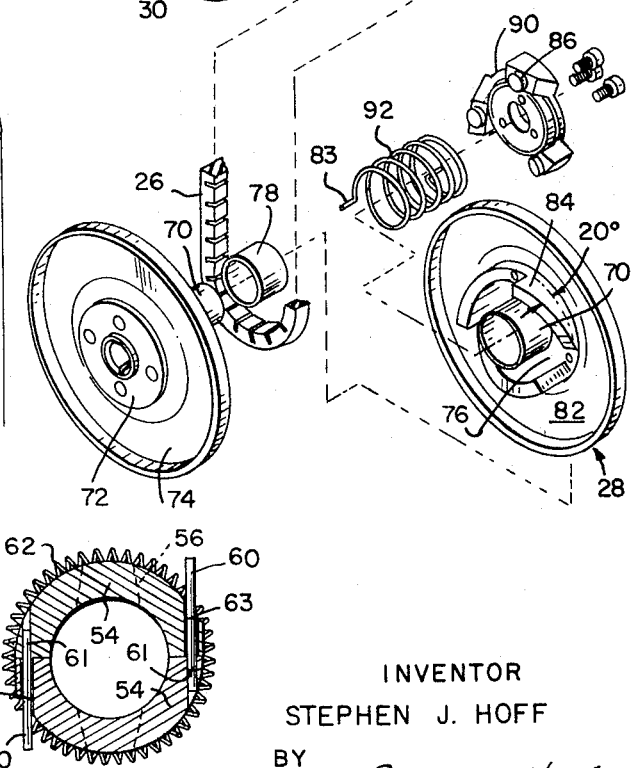
Fig.8
INVENTOR
STEPHEN J. HOFF
BY
Frank, Jenkins & Hanley
ATTORNEYS

United States Patent Office 3,625,079
Patented Dec. 7, 1971

3,625,079
VARIABLE RATIO MINI BIKE DRIVE
Stephen J. Hoff, Richmond, Ind., assignor to Hoffco, Inc., Richmond, Ind.
Filed Sept. 21, 1970, Ser. No. 73,916
Int. Cl. F16h 55/52
U.S. Cl. 74—230.17     18 Claims

ABSTRACT OF THE DISCLOSURE

A variable-ratio belt drive for mini bikes and the like, responsive to both engine speed and drive torque. A normally-open, variable-width driver pulley responsive to engine speed is connected by a V-belt to a normally-closed variable-width driven pulley which initially gives a high-reduction drive ratio, e.g., 3:1. One flange of the driven pulley is movable and urged toward the fixed flange by low-angle cams and a torsion spring. A movable flange of the driver pulley is urged toward the fixed flange thereof by wedge weights acting between the movable flange and a reaction cone, so that increased speed closes the driver pulley and exerts belt tension to open the driven pulley, which lowers the drive ratio. High torque causes the cams to close the driven pulley and overcome the speed-response control, hence to increase the drive ratio to handle the increased torque at high engine speed.

---

The highly desirable objective of good clutch action and smooth, wide-range response both to speed and torque is obtained by use of the wedge-weight actuated driver pulley and coordination of its wedge angle of about 45° with a small angle pulley V-groove of from 15.5° and 30° and with a low ram ramp-angle of about 20°.

The wedge weights used are half rings with central wedge pad faces, positively guided for diametric movement by a pair of end guide posts, one fixed in each weight. The weights are biased to retracted position by garter springs in grooves on opposite sides of the guide posts. Weight mass is varied by coring and material selection, e.g., iron, aluminum or nylon, to change speed responsiveness for different applications.

The V-groove and belt may be either symmetric or asymmetric. Drive ratio range depends on the included angle of the pulley V-grooves in either case. A preferred symmetric included angle of 26° gives a drive ratio range of from 3.2:1 in "low" to 1:1 in "high". A symmetric included angle of 22° or an asymmetric angle arrangement of 18° and 2.5° both give a drive ratio range from 3.2:1 in "low" to an overdrive of about 0.85:1 in "high."

BACKGROUND OF THE INVENTION

This invention relates to a variable-ratio belt drive for mini bikes and like small vehicles, as exemplified in the foregoing Abstract of the Disclosure. Primary control of the drive ratio is provided by a speed-responsive pulley driven by the engine, and secondary control is provided by a torque-responsive driven pulley which in response to increased torque in the drive train applies feed-back belt tension to counteract the speed response and increase the drive ratio over that which the speed-responsive mechanism tends to provide. The variable ratio drive may employ a symmetric belt and pulleys, or may employ an asymmetric belt and pulleys in which one side of the belt and one flange of the pulley have only a small face angle while the other side has a large face angle, in accordance with known practice. (By "face angle" I mean the angle between the face of the belt or pulley and a plane perpendicular to the pulley axis.) In either case, the drive ratio range is proportional to the included angle between the pulley flanges. The sides of the belt are desirably shaped to conform to the pulley flanges.

In a variable ratio mini bike drive, it is essential to provide reliable operation, especially in clutching and declutching. It is also highly desirable to have smooth operation of ratio change in response both to speed and to torque. Such reliable and smooth operation depends in important respects on the ability of the speed responsive mechanism to exert its primary control of the drive ratio in response to speed while also responding readily to counteracting feedback tension in the belt from the torque-responsive driven pulley.

The present invention provides a variable-ratio belt drive, in both symmetric and asymmetric modifications, in which the speed-responsive control mechanism is coordinated with the other parts to provide reliable clutching and smooth response both to speed and to torque.

The general system of a speed-responsive and torque-responsive variable ratio belt drive has been known for many years, as shown, for example, by the Perrine U.S. Pat. No. 2,150,456 (1939) and Oehrli U.S. Pat. No. 2,678,566 (1954).

I prefer to use a speed responsive pulley having wedge-weights which do not transmit drive, of the general type shown, for example, in Mack U.S. Pat. No. 2,253,634 (1941), and Davis U.S. Pat. No. 2,928,286 (1960). In such patents, the weights are loose and tend to get jammed, and the action is not coordinated for response to torque-sensitive feed-back. Perrine and Oehrli disclose driven pulleys which appear to provide functional torque response. I prefer to use a torque-responsive pulley of the configuration shown in Miner U.S. Pat. No. 2,711,103 (1955). The aforementioned patents show symmetric pulleys and belts but corresponding asymmetric variable-ratio belt drives are shown in French Pat. No. 373,611 of 1907 and French Pat. No. 692,864 of 1930, and more recently in Moogk U.S. Pat. No. 3,365,967 (1968).

In accordance with the present invention, the variable ratio belt drive comprises a combination which includes: (a) a speed-responsive and de-clutching pulley having a movable flange actuated toward a fixed flange by a pair of half-ring wedge weights interconnected by guides and biased to retracted position by a pair of garter springs, and acting between the movable flange and a reaction core with an included wedge angle of reversible size; (b) a torque-responsive driven pulley having a slidable and rotatable flange urged to closed position against a fixed flange by helical cams and a torsion spring; and (c) a V-belt engaged in the pulleys; and in which the wedge weights preferably have an included angle of about 45° to provide both speed responsive wedging and torque-responsive retraction, the pulley V-grooves have an included angle of from about 15° to 30° and preferably not above 26°, and the helical cams have a low ramp angle of about 20° and are at a sufficient radius to give full throw in an angular displacement of less than 90°.

The wedge-weights used are of half-ring shape with two axially-spaced peripheral groves to receive the retraction springs. Each weight carries a tangentially extending guide pin fixed in one end of the weights and loosely received in a guide hole in the opposite weight so that the two weights are accurately guided for straight-line movement with respect to each other. Each weight has cam pads on its opposite faces, centrally between its ends for engagement with the outwardly converging conical surfaces against which it rides in its speed responsive movements. The two weights are desirably formed of a material which, with lubrication, has good wearing qualities for sliding movement against the movable pulley flange and the reaction plate which are both formed of heavy guage stamped sheet steel.

The speed-responsive driver pulley is normally open sufficiently to allow the belt to ride freely on a bearing sleeve at the bottom of its V-groove, so that it is declutched from the belt. As the speed-responsive driver pullley is rotated, its wedge weights move outward under centrifugal force and urge the pulley flanges together, first to engage the belt, and then to drive the belt with a progressively increasing effective radius. As the belt is forced outward by this action of the speed responsive driver pulley, it is pulled inward in the V-groove of the driven pulley, and the flanges of such driven pulley are pressed apart against their closing bias. This causes the movable flange of such driven pulley to be rotated relative to the fixed flange in a direction opposite to that of pulley rotation. When increased torque is encountered, such torque rotates the movable flange of the driven pulley forward in the direction of rotation, and causes the cams to force the driven pulley flanges together, which forces the belt to run at a larger effective diameter on the driven pulley. This action exerts feed-back tension through the belt to the driver pulley to force its flanges apart, in counteraction to the effect of the wedge weights, and such weights are forced inward to a more retracted position than they would otherwise take under centrifugal force. The speed-response of the driver pulley and the torque-response of the driven pulley continuously interact to cause the drive to assume at all times a ratio which is dependent both on the speed of the driving shaft and on the torque transmitted. As the speed of the driving shaft increase, the drive ratio tends to decrease, as from a "low" drive of 3.2:1 toward a "high" drive of 1:1, whereas as the torque increases, a reverse change occurs.

The range of drive ratios provided is proportional to the included angle between the sides of the V-groove formed by the pulley flanges, and such V-groove and the belt used therewith may be either symmetric or asymmetric. Generally speaking, the smaller the included angle, the greater the range of speed ratio change which will be provided. However, as the included angle is reduced, so also is the maximum driving load which can be transmitted. For general purpose applications, I prefer to use a V-groove included angle of approximately 26°, which in a symmetrical embodiment is provided by two pulley flanges having a face angle of 13°, which gives a range of from 3.2:1 to 1:1 in that embodiment. For a greater drive ratio range, the included angle may be of the order of 20° or less. In an asymmetric embodiment, I have used a fixed pulley flange of 2½° face angle and a movable pulley flange of 18° face angle, which gives a ratio range of from 3.2:1 to about 0.85:1. A corresponding range is obtained with symmetric face angles of 11° each to provide an included angle of 22°. I have obtained an even greater range by using a 2½° face-angle flange in combination with a 13° face-angle flange, to give an included angle of 15½°.

The symmetric and asymmetric arrangements differ in the provisions made to minimize belt misalignment. For this purpose, in symmetric arrangements, the fixed flanges of the two pulleys are placed on opposite sides of the belt, as in Oehrli U.S. Patent 2,678,566, so that lateral belt movements at the two pulleys offset each other. In asymmetric arrangements, the fixed flat flanges are placed on the same side of the belt, as in French patent No. 692,864, since there is little or no lateral movement of the belt relative to such low-angle flanges.

Other features of the invention will appear from the following description of two preferred embodiments and from the appended claims.

The accompanying drawings illustrate the invention. In such drawings:

FIG. 5 is an exploded view of the symmetric variable speed drive of FIGS. 3 and 4;

FIGS. 6 and 7 are axial sections of a variable ratio drive of asymmetric configuration embodying the invention, and FIG. 8 is a sectional view of the wedge-weights.

Figure 1:
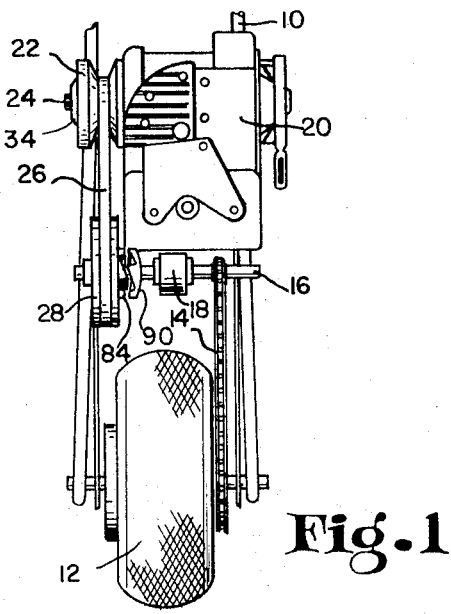
FIG. 1 is a plan view of the engine and drive mechanism of a mini bike having a variable-ratio drive of symmetric configuration embodying the invention.

The mini bike shown in FIG. 1 comprises a frame 10 having a rear drive wheel 12 driven by a chain 14 from a jack shaft 16 mounted in a bearing 18. An engine 20 mounted on the frame 10 has a driver pulley 22 mounted on its shaft 24 and connected by a belt to a driven pulley 28 mounted on the jack shaft 16.

Figure 3:
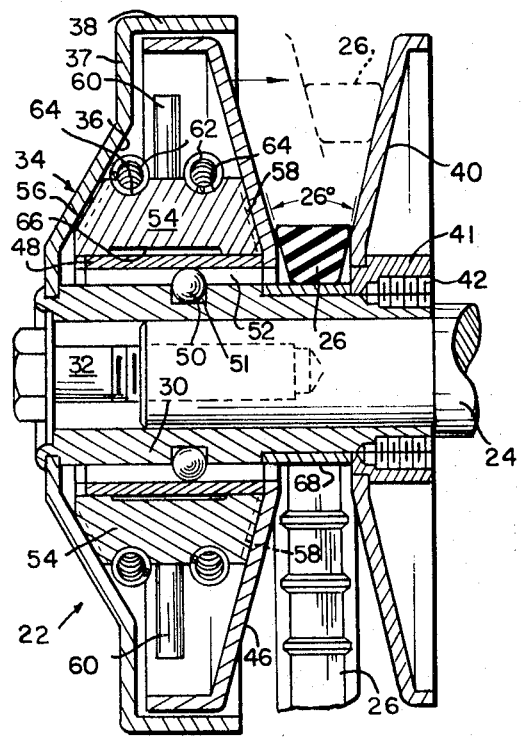
FIGS. 3 and 4 are axial sections of the driver and driven pulleys of a variable ratio drive of symmetric configuration embodying the invention.
Figure 4:
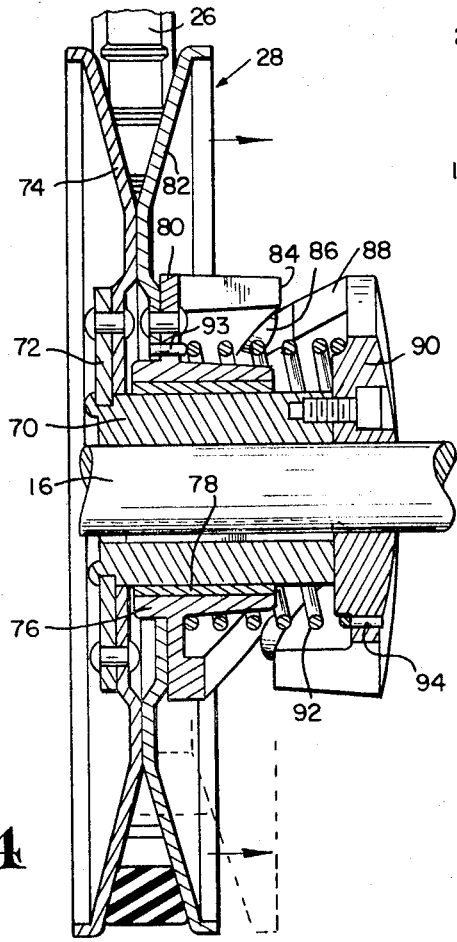

The driver pulley 22 and driven pulley 28, with the belt 26, comprise the variable ratio drive mechanism more fully shown in FIGS. 3 and 4. The driver pulley 22 comprises a hub 30 mounted against a shoulder on the engine shaft 24 and held in place by a bolt 32 screwed into a tapped hole in the shaft 24. A reaction drum or cone 34 is fixed to the outer end of the hub and includes a conical section presenting an inner conical face 36, joined by a radial flange 37 to a drum portion 38. A fixed pulley flange 40 having an inner collar 41 is fixed to the inner end of the hub 30 by a plurality of circumferentially-spaced axial set screws 42 threaded into tapped holes at the interface between the fixed-flange collar 41 and the hub 30. A movable pulley flange 46 fixed to the end of a bearing sleeve 48 is mounted on the hub 30 for axial sliding movement. The flange and sleeve are prevented from rotation on the hub by four balls 50 set in sockets 51 in the hub 30 and engaged in axial keyways 52 in the bearing sleeve 48.

Two half-ring centrifugal wedge-weights 54 are mounted about the outer cylindrical surface of the bearing sleeve 48 for the movable pulley flange 46. See FIGS. 3 and 5. Each has a rear pressure pad 56 intermediate its arcuate length to bear against the inner conical face 36 of the reaction cone 34. Each also has a front pressure pad 58 opposite its pressure pad 56, to engage the back conical face of the movable pulley flange 46. As appears in FIGS. 5 and 8, each weight 54 has a guide pin 60 fixed in its end 61 in a position to extend tangentially through a loosely-fitting guide hole 63 in the end of the opposite weight 54.

The weights are biased to retracted position by a pair of garter springs 62 received in circumferential grooves 64 formed in the outer surface of the weights in axially spaced relation on opposite sides of the plane of the two guide pins 60. To control the mass of the weights 54, they may be provided with internal cavities 66 of selected depth.

The driver pulley 22 serves not only as variable-pitch pulley, but also as a clutch to disengage the belt 26. To this end, the movable pulley flange 46 is movable to the left in FIG. 3 to a position such that the flanges 40 and 46 have no driving contact with the side faces of the belt 26. To support the belt under these circumstances and permit the driver sheave assembly 22 to rotate freely without wear on the belt, the hub 30 is provided with a freely rotatable bearing sleeve 68 mounted on a reduced portion of the hub 30 at the bottom of the V-groove, between the fixed collar 41 and a shoulder on the hub 30. The outer diameter of such sleeve 68 is smaller than the inner diameter of the bearing sleeve 48, so that such sleeve and the movable flange 46 can move over the outside of the sleeve 68 toward the fixed flange 40.

Positive declutching requires full disengagement of the flanges 40 and 46 from the belt. The axial set screws 42 provide for positive adjustment of the flange 40 to vary the open width of the groove. The tapped holes for such screws are half in the hub 30 and half in the collar 41, and the two halves of the threads will come into alignment in any of several positions of axial adjustment, spaced from each other by increments equal to the pitch of the threads. Accordiingly, the collar 41 can be adjusted in small increments equal to the pitch distance of the threads, and can be locked in any of such positions by inserting the set screws 42 in the realigned thread halves.

The operation of the driver assembly 22 provides a clutching function between the engine shaft 24 and the belt 26, and provides a variable-pitch pulley for driving such belt 26. With the engine shaft 24 at idling speed, the weights 54 are held in retracted position by the garter springs 62, and the movable flange 46 is free to move far enough away from the fixed flange 40 to permit the belt 26 to ride freely on the bearing sleeve 68 with no drive transmitted from the pulley to such belt. As the engine speed is increased, the weights 54 move outward against the spring bias and force the pressure pads 56 and 58 against the outward converging conical faces of the reaction cone 34 and the movable pulley flange 46, and this forces the movable flange 46 toward the fixed flange 40. The pulley flanges then drivingly engage the side faces of the belt 26 and exert driving traction on that belt. Initially the pulley has a small effective radius, and as the drive speed increases the centrifugal weights 54 move farther out, and press the flanges 46 and 40 closer together so that the effective radius increases. As this occurs, the belt 26 moves outward along the sloping face of the fixed flange 40, and laterally with respect to its original position. The intermost position of the belt 26 is shown in full lines in FIG. 3, while an outer position is shown in dotted lines.

The driven pulley 28 shown in FIG. 4 comprises a hub 70 keyed to the jack shaft 16 and carrying a fixed mounting plate 72 to which the fixed pulley flange 74 is riveted. A bearing sleeve 76 fitted with a bearing 78 is slidably and rotatably carried by the hub 70, and a movable pulley flange 82 is riveted to a flange 80 on such sleeve 76. The outer periphery of the flange 80 carries three circumferentially-spaced helical cams 84, which bear against anti-friction pads 86 carried by three cam-shaped bosses 88 on a fixed cam plate 90 bolted to the end of the hub 70. A torsion spring 92 has its ends 93 and 94 bent axially and engaged in holes in the mounting flange 80 and in the fixed cam 90. The spring 92 is of a hand and stressed in a manner such that it biases the movable pulley flange 82 and its supporting mounting plate 80 in a rotational direction to cause the cam flights 84 to cam the movable pulley flange 82 toward the fixed pulley flange 74. This involves relative rotational movement of the flanges 74 and 82, and the direction of drive rotation is such that the movable pulley flange moves forward in the direction of drive rotation as it is cammed toward the fixed pulley flange 74 by the cam flights 84.

In operation, when the driver pulley assembly 22 and the driven pulley assembly 28 are in non-driving condition, that is, when the engine is operating at idling speed, the pulley 22 is fully open so that the belt 26 can drop to the bottom of the V-groove of such driver pulley 22, where it rides on the rotating sleeve 68, and is de-clutched from the pulley. With the belt loose on the driven pulley 28, the torsion spring 92 will rotate the movable flange 82 in a direction to cause the cams 84 to push such flange to its fully closed position against the fixed pulley flange 74, and the belt takes a position at the outer periphery of the driven pulley, as shown in full lines in FIG. 4.

As the engine is speeded up, the driver pulley 22 exercises its clutching function and moves its flanges 40 and 46 toward each other to grip the sides of the belt. The transmission then transmits drive at its greatest, or "low" drive ratio, say of 3.2:1, since the driver pulley is at its smallest effective radius while the driven pulley is at its largest effective radius. As vehicle speed picks up, the wedge weights 54 of the driver pulley respond to centrifugal force to cause such pulley to progressively close its V-groove to increase its effective radius. This exerts increased tension on the belt 26 which at the driven pulley 26 forces the movable flange 82 outward away from the fixed flange 74 of such driven pulley, against the closing bias of the torsion spring 92 and the cams 84. In such outward movement, the movable flange 82 also rotates relative to the fixed flange 74 in a direction rearward of the direction of drive rotation. This action produces an increasing pitch of the driver pulley and a decreasing pitch of the driven pulley, which progressively reduces the drive ratio, down to a smallest ratio of say 1:1.

If increased torque is encountered, the driven pulley 28 responds thereto to increase the drive ratio. Such torque increases the belt pull, which in turn rotates the movable pulley flange 82 forward in the direction of drive rotation relative to the hub 70, and this causes the cams 84 to ride on the cam reaction pads 86 to force the movable pulley flange 82 toward the fixed flange 76. This in turn causes the belt to ride at a larger radius on the driven pulley and to draw it to a smaller radius in the driving pulley in counteraction to the effect of the wedge weights 54, and the weights 54 are thereby forced inward to a more retracted position. This action increases the effective radius of the driven pulley 28 and decreases the effective radius of the driver pulley 22, and causes an increase in the drive ratio.

There is a continuous equilibrium between the speed response produced by the action of the centrifugal weights 54 in the driver pulley and the torque response produced by the action of the cam flights 84 in the driven pulley, and the drive ratio is continuously and infinitely varied in response to these two actions to provide a drive ratio suited to the existing operation conditions.

In the apparatus of FIGS. 3 and 4, where the pulleys and belt are symmetrical, changes in drive ratio are accompanied by lateral movement of the belt 26 as it moves in and out of the pulleys between the full line position shown (for "low" drive) and the dotted position shown (for "high" drive). The belt moves along the sloping face of the fixed flanges 40 and 74 of the two pulleys. Such fixed flanges have the same or similar face angles, and are placed on opposite sides of the belt, in order to maintain the belt in approximate alignment at all positions. However, because the two pulleys have different diameters, some misalignment normally occurs and is inherent in this symmetrical arrangement.

As is known from the prior art, as from the French patents mentioned above, this misalignment can be avoided by using an asymmetric pulley and belt arrangement such as that shown in FIGS. 6 and 7. Here, the driver pulley 122 is identical with the driver pulley 22 of FIG. 3 except only that its fixed pulley flange 140 has a very small face angle so that it is substantially flat, and the movable pulley flange 146 has a relatively large face angle. In the transmission shown, the pulley flange 140 has a face angle of approximately 2½°, and the movable flange 146 has a face angle of 18°, which gives an included angle between the faces of the two pulley flanges of 20½°.

The belt 126 is similarly asymmetric, and is formed with one face at 2½° to mate with the fixed flange 140 and with the other face at 18° to mate with the movable flange 146. The other parts of the driver pulley assembly 122 shown in FIG. 6 are identical with the corresponding parts of the symmetric driver pulley assembly 22 of FIG. 3, and are similarly numbered.

The driven pulley 128 of FIG. 7 is similar to the symmetric pulley of FIG. 4, but uses pulley flanges 174 and 182 having face angles corresponding to those of the driver pulley and also contains certain other differences. In order to make the asymmetric arrangement effective to reduce misalignment of the belt 126, the relative position of the fixed and movable flanges are reversed, relative to FIG. 4, to place the fixed flange 174 on the same side of the belt as the fixed flange 140 of the driver pulley 122. With the fixed flanges on the same side of the belt, movements of the belt in and out along their substantially flat faces produces very little lateral movement, and almost no belt misalignment occurs. The 2½° face angle on the fixed pulley flanges 140 and 174 is small enough to minimize belt misalignment during ratio changes of the transmission, while large enough to avoid significant binding or scrubbing action between the relatively flat face of the belt 126 and the relatively flat face of the pulley flange 140.

The driven pulley assembly 128 comprises a hub 170 carrying a mounting plate 172 to which the fixed pulley flange 174 is riveted. A bearing sleeve 176 is slidable and rotatable on the hub 170 and carries a series of three helical cams 184 which engage against anti-friction pads 186 carried by three cam shaped bosses 188 on a fixed cam member 190 bolted to the end of the hub 170. The movable pulley flange 182 is riveted to the flange 180 of the bearing sleeve 176.

Since this driven pulley 128 is turned end for end with respect to the driven pulley assembly 82 of FIG. 4, the cams 184 are of opposite hand, to preserve the relationship in which the movable pulley flange 182 is cammed toward the fixed pulley flange 174 as such movable flange 182 rotates forward in a direction of drive rotation with respect to the fixed flange 174.

This asymmetric arrangement shown in FIGS. 6 and 7 operates in a manner analogous to that described above in connection with FIGS. 3 and 4. The driver pulley 140 opens wide enough to disengage from the belt 126 to provide de-clutching. In "low" drive, which provides the greatest drive ratio, the pulley 126 is at the bottom of the V-groove of the driver pulley 122 and is at the outer periphery of the V-groove of the driven pulley 128, and this transmits greatest torque to get the vehicle under way. As engine speed and vehicle speed increase, the speed responsive driver pulley 122 is actuated by the centrifugal weights 54 to close its V-groove and move the belt outward toward its outermost position shown in dotted lines. This causes the belt to be pulled inwardly in the V-groove of the driven pulley 128, which forces the movable pulley flange 182 away from the fixed pulley flange 174 against the bias of the torsion spring 192. The camming action causes the movable pulley flange to rotate rearward of the direction of drive rotation relative to the fixed pulley flange 174. The belt 126 then moves from its outermost position in the driven pulley toward its innermost position, shown in dotted lines in FIG. 7, where its effective radius may be as small as, or smaller than the effective radius of the driver pulley 122, to provide either a direct-drive drive ratio of 1:1, or an over-drive drive ratio, say of 0.85:1.

In a system of the type shown, whether of symmetric or asymmetric configuration, it is critically important that the driver pulley provide a declutching action which is highly reliable and certain, and which is fully responsive to the action of the operator in decelerating the engine to idling speed. The clutching and declutching function is directly related to the operation of the centrifugal weights 54, and the arrangement must provide certainty that they will move to retracted position when the engine shaft is decelerated. They must not jam or stick in expanded position and thereby prevent separation of the movable and fixed flanges of the driver pulley assembly to a declutching position.

The smooth and responsive action of the centrifugal weights 54 is also highly important in the operation of the mechanism as a variable ratio drive and to provide a smooth and responsive change of drive ratio as speed and torque conditions change. Such operation is important not only during acceleration, when the centrifugal weights move outward to press the pulley flanges together, but equally or more important in down-shifting when the driver pulley flanges are forced apart by the torque responsive action of the driven pulley, acting to pull the belt inward in the driver pulley between such flanges. The lateral force then exerted by the movable pulley flange on the centrifugal weights 54 must cause them to move toward a retracted position. The down-shifting response is also vitally effected by the slope or ramp angle of the cams 84 and 184 of the torque responsive mechanism of the driven pulley. The action is of course also effected by the included angle between the companion flanges of the fixed and movable pulleys in every case.

The range of drive ratio change provided by any system of this type is proportional to the included angle between such pulley flanges. In general, the smaller the included angle, the greater the range of drive ratio which the system provides. The extent to which the included angle can be reduced, however, is limited by the necessity for retaining good characteristics of belt operation between the flanges, and especially upon the ability of the system, in view of the several factors mentioned above, to provide a smooth and sensitive response to speed changes, and especially a good down-shifting response to torque reaction.

On the basis of tests with different angles and angle combinations, I have found it desirable to use a ramp angle on the cam flights 84 of approximately 20°. I have found it desirable to employ an included angle of approximately 45° for the cones between which the centrifugal weights 54 act. Accordingly, I form the conical surface 36 of the reaction cone 34 of the driver pulley 22 with a face angle of 30° to a plane perpendicular to the axis of the shaft 24, and I form the face of the left hand pressure pad 56 of each centrifugal weight 54 with a corresponding face angle of 30°. The opposite or right hand pressure pad 58 of each centrifugal weight has a substantially conical surface with a face angle of approximately 15°, which I find provides effective cooperation with the rear face of the movable pulley flange 46 of FIG. 3 which has a face angle of 13°, and also works satisfactorily with the pulley flange 146 of FIG. 6 which has a face angle of 18°. The included angle of approximately 45° between the pressure faces of the centrifugal weights 54 give effective and smooth operation both in their outward movement under centrifugal force and in their necessary inward movement in response to increased belt tension produced by the torque responsive mechanism of the driven pulley assembly.

With the angles mentioned—of 45° for the wedge faces of the weights 54, and a 20° ramp angle for the cams 84, I have used a range of included angles for the pulleys. In a general purpose mini bike transmission, of symmetrical configuration, I have used face angles of 13° on the flanges 40 and 46 of the driver pulley 22 and the flanges 74 and 82 of the driven pulley 28, to give an included angle of 26° in the V-groove of each pulley. This gives a drive ratio range of from 3.2:1 in "low" to 1:1 in "high."

In the asymmetric arrangement shown in FIGS. 6 and 7, the fixed pulley flanges 140 and 174 have a face angle of 2½° and the movable pulley flanges have a face angle of 18°, to give an included angle of 20½°, and this gives a drive ratio range from 3.2:1 to .85:1. This same relatively high range of drive ratios is also obtained in a symmetrical configuration by using face angles on symmetrical pulley flanges of 10½° and an included angle of 21°. I have obtained an even greater drive ratio range by further reducing the included angle. In an asymmetric configuration, I have used fixed pulley flanges having a face angle of 2½°, as in FIGS. 6 and 7, with movable pulley flanges having a face angle of 13°, as in FIGS. 3 and 4, to obtain an included angle of 15½° for each pulley. With the related conditions previously mentioned, I consider this included angle of approximately 15° to be the preferred minimum angle for use in a system of this character. At the other end of the scale, the included angle may be greater than the 26° shown in FIGS. 3 and 4, and while large angles are desirable in some respects for heavy duty operation, the drive ratio range is progressively decreased. With the other conditions set forth, I prefer to use an included angle not substantially greater than about 30°.

In order to maintain reasonable belt alignment in variable ratio drives of the type described, the symmetric configuration shown in FIGS. 1, 3 and 4 requires that the fixed pulley flanges of the two pulleys, along the face of which the belt moves, must be on opposite sides of the belt. In the asymmetric arrangement of FIGS. 2, 6 and 7, on the other hand, belt alignment is maintained by disposing the fixed pulley flanges on the same side of the belt. The two arrangements give the designer a choice of arrangements to fit particular structural requirements.

In the arrangement shown in FIG. 1, the driver pulley assembly is mounted on the engine shaft 24 close to the face of the engine 20, with the speed responsive mechanism housed in the reaction cone 34 at the outside. The driven pulley 28 is mounted on the jack shaft 16 behind the engine 20, and ample space is available inside the pulley for the torque responsive mechanism 84, 90. The wheel sprocket is on the opposite side of the wheel 12, so that the chain 14 from the jack shaft 16 to the wheel sprocket can be on the opposite side of the wheel from the torque responsive pulley assembly 28. The symmetric drive thus gives an advantageous configuration in this application.

Figure 2:
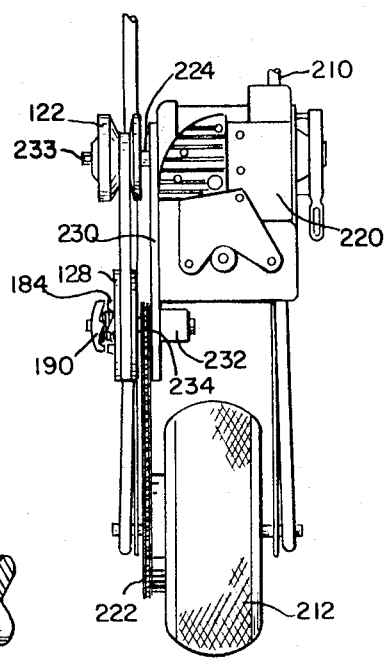
FIG. 2 is a similar plan view of the drive mechanism of a mini bike having a variable-ratio drive of asymmetric configuration embodying the invention.

The arrangement shown in FIG. 2 exemplifies an application of the asymmetric drive of FIGS. 6 and 7 in a novel drive arrangement which may be used to modify a direct drive mini-bike to provide it with a variable speed transmission in accordance with the present invention. The mini-bike shown in FIG. 2 has a frame 210 with a rear wheel 212, and an engine 220. As originally designed, the engine 220 carried a sprocket on its shaft 224 which was directly connected to the wheel sprocket 225 at the left side of the wheel. To modify this original design for use of a variable ratio drive in accordance with the present invention, I provide a mounting plate 230 which bolts against the side of the engine 220 and which has a bearing support 232 in position to lie behind the engine. A pulley assembly 122 is mounted directly on the engine shaft 224, and the driven pulley assembly 128 is mounted on a stub shaft 233 journalled in the bearing support 232, with a narrow sprocket 234 between the driven sprocket assembly 128 and the mounting plate 230. The asymmetric configuration disposes the torque responsive mechanism 184, 190 at the outside of the driven pulley assembly 128, which allows the two pulleys to be mounted close to the mounting plate 230 and permits the output sprocket 234 to be located in position for direct connection to the original wheel sprocket 222.

The mounting plate 230 and the two pulley assemblies 122 and 128 can be provided as a kit with which either the original manufacturer or a purchaser can convert the original direct-drive mini-bike to a variable speed bike.

I claim:

1. A variable ratio belt drive for a mini bike or the like comprising the combination of driver and driven pulleys each having companion flanges defining a belt-receiving V-groove, the driven pulley having an output hub and a movable flange and cam means which cams such flange toward its companion flange to narrow the V-groove therebetween in consequence of torque-responsive forward rotation of such movable flange relative to said hub in the direction of drive rotation, and thereby to increase the effective radius of such driven pulley, the driver pulley having a movable flange and speed responsive means which urges the same toward its companion flange to narrow the V-groove therebetween, and thereby to increase the effective radius of the driver pulley, the pulleys being interconnected by a belt of fixed length and the groove-narrowing effects of the two pulleys being thereby placed in counteracting relation, wherein the improvement comprises, in combination with said driver pulley, speed-responsive means comprising a first conical weight-engaging face on the movable flange of said driver pulley, a fixed conical reaction plate having a second conical weight-engaging face thereon disposed toward said first weight engaging face, the two weight-engaging faces converging outward from the axis of the driver pulley, a pair of arcuate wedge weights disposed in diametrically opposite positions between said weight engaging faces and having opposite pressure areas disposed intermediate the length of the arcuate wedge-weights and engaging said faces, spring means carried by said wedge-weights and interconnecting the same to bias them toward retracted position, and a pair of parallel guide pins extending between said weights at the ends thereof, one fixed in each weight and slidable in the other.

2. A variable-ratio drive in accordance with claim 1, with the addition that said spring means comprises a pair of garter springs about said pair of wedge weights on opposite sides of the pair of guide pins, and means on said weights to retain the garter springs in position thereon.

3. A variable-ratio drive in accordance with claim 1, with the addition that said wedge weights have a fully retracted position wherein the pulley flanges are spaced suffiently to disengage the sides of the belt.

4. A variable ratio drive in accordance with claim 1 in which the included angle between said conical weight engaging faces and between the face engaging surfaces of the weights is approximately 45° whereby belt-tension increases created by the torque-responsive driven pulley will readily counteract the speed-responsive outward wedging effect of the wedge weights and force said weights inward toward a retracted position.

5. A variable ratio drive in accordance with claim 3 in which the included angle between said conical weight engaging faces and between the face engaging surfaces of the weights is approximately 45° whereby belt-tension increases created by the torque-responsive driven pulley will readily counteract the speed-responsive outward wedging effect of the wedge weights and force said weights inward toward a retracted position.

6. A variable ratio drive in accordance with claim 4 in which the reaction cone has a face angle of approximately 30°, the movable pulley flange is formed as a formed sheet metal part of the rear face of which forms said first conical weight-engaging face and has a face angle of from about 13° to about 18°.

7. A variable ratio belt drive for a mini bike or the like comprising the combination of driver and driven pulleys each having companion flanges defining a belt-receiving V-groove, the driven pulley having an output hub and a movable flange and cam means which cams such flange toward its companion flange to narrow the V-groove therebetween in consequence of torque-responsive forward rotation of such movable flange relative to said hub in the direction of drive rotation, and thereby to increase the effective radius of such driven pulley, the driver pulley having a movable flange and speed responsive means which urges the same toward its companion flange to narrow the V-groove therebetween, and thereby to increase the effective radius of the driver pulley, the pulleys being interconnected by a belt of fixed length and the groove-narrowing effects of the two pulleys being thereby placed in counteracting relation, wherein the improvement comprises, in combination with said driver pulley, speed-responsive means comprising a first conical weight-engaging face on the movable flange of said driver pulley, a fixed conical reaction plate having a second conical weight-engaging face thereon disposed toward said first weight engaging face, the two weight-engaging faces converging outward from the axis of the driver pulley, a pair of arcuate wedge weights disposed in diametrically opposite positions between said faces and having opposite face-engaging surfaces intermediate the length of said weights, parallel guide means for guiding said weights for diametrically opposite movements in response to centrifugal force to wedge said conical faces apart and thereby close the V-groove of the driver pulley, means biasing said weights to retracted position, the included angle between said conical faces and between said face engaging surfaces on said weights being approximately 45°, whereby increases of belt tension created in the belt by the torque-responsive driven pulley, will readily counteract the outward wedging effect of the wedge weights and force them toward a retracted position.

8. A variable-ratio belt drive according to claim 7 wherein the driven pulley has a fixed pulley flange on said hub, said cam means act between the movable flange and the hub, and said cam means has a low ramp angle of approximately 20° whereby in response to increasing torque said cam means will readily and positively force said movable flange toward said fixed flange and thereby create belt tension to counteract centrifugal force on said wedge weights.

9. A variable ratio belt drive according to claim 8 wherein the pulley flanges have an included angle of from 15° to 30°.

10. A variable ratio belt drive according to claim 8 wherein the pulley flanges have an included angle of approximately 20°.

11. A variable ratio belt drive according to claim 8 wherein the pulley flanges have an included angle of approximately 26°.

12. A variable ratio belt drive according to claim 9 wherein the pulley flanges are asymmetrical, and each fixed flange has a face angle of approximately 2½°.

13. A variable ratio centrifugal pulley, comprising:

a hub having a fixed pulley flange thereon, a movable pulley flange on said hub, and having a rear conical weight-engaging face, a conical reaction plate spaced from the movable flange and having a conical weight-engaging face, said two weight-engaging faces converging outward from the axis of the pulley, a pair of arcuate wedge weights disposed in diametrically opposite relation between said weight-engaging faces, a pair of parallel guide pins extending between said weights at the end thereof, one fixed to each weight and slidable in the other, the weights being thereby guided for diametric movement relative to one another and outward on the conical faces.

14. A variable-ratio centrifugal pulley according to claim 13 further comprising:

a bearing sleeve slidably but non-rotatably mounted on said hub, the movable pulley flange being fixed to said sleeve, said weights being formed internally to seat against said sleeve, and spring means biasing said weights to retracted position against said sleeve.

15. A variable-ratio centrifugal pulley according to claim 13 wherein said bearing sleeve is formed with a plurality of internal axial grooves and said hub is formed with a plurality of sockets, and balls in said sockets engaged in said grooves to guide said sleeve for non-rotative axial movement.

16. A variable-ratio centrifugal pulley according to claim 13 further comprising:

a pair of garter springs encircling said weights on opposite sides of said guide pins, said weights being formed with grooves to retain the springs in place.

17. A variable-ratio centrifugal pulley according to claim 13 further comprising;

opposite pressure pads of limited area centered between the arcuate length of each wedge weight in position to engage said conical weight-engaging faces.

18. A variable-ratio centrifugal pulley according to claim 13 wherein said fixed flange is fixed to a collar slideably received on said hub, and a plurality of set screws threaded into threaded holes axially disposed at the interface between said hub and collar with part of the screw threads in each, the collar being slidable on the hub to different positions of adjustment wherein the thread-parts are aligned in different axial positions, the fixed pulley flange being thereby adjustable in increments equal to the thread pitch distance to vary its spacing from its companion flange.

References Cited

UNITED STATES PATENTS

| 2,612,054 | 9/1952 | Davis | 74—230.17 E |
| 2,623,400 | 12/1952 | Davis | 74—230.17 E |
| 2,709,372 | 5/1955 | Melone | 74—230.17 E |
| 2,909,073 | 10/1959 | Putz | 74—230.17 E |

FOREIGN PATENTS

| 883,174 | 3/1943 | France | 74—230.17 |

C. J. HUSAR, Primary Examiner

U.S. Cl. X.R.

180—33 B